United States Patent

[11] 3,532,213

| [72] | Inventors | Herbert A. Schulz<br>Los Altos;<br>Floyd Jensen, Saratoga; Roger D. Chase,<br>Santa Clara, California |
|---|---|---|
| [21] | Appl. No. | 810,544 |
| [22] | Filed | March 26, 1969 |
| [45] | Patented | Oct. 6, 1970 |
| [73] | Assignee | Varian Associates<br>Palo Alto, California<br>a corporation of California |

[54] HOLDER FOR INSPECTION, SHIPPING AND STORAGE OF GLASS OPTICAL ELEMENTS
4 Claims, 3 Drawing Figs.

[52] U.S. Cl. .................................................. 206/62,
206/18
[51] Int. Cl. ..................................................... B65d 85/48,
A45c 11/00
[50] Field of Search .......................................... 206/62, 18,
65, 52(F), 45, 45.14, 45.13; 145/51; 294/62; 312/71, 73

[56] References Cited
UNITED STATES PATENTS

| 293,046 | 2/1884 | Locke | 206/18 |
| 1,450,203 | 4/1923 | De Brown | 145/51 |
| 1,799,994 | 4/1931 | Sternberg | 312/73 |
| 3,283,892 | 11/1966 | Rosen | 206/65 |
| 3,341,001 | 9/1967 | Barclay et al. | 206/52(F) |

Primary Examiner—William T. Dixson, Jr.
Attorneys—Stanley Z. Cole and Robert W. Dilts ABSTRACT: A base has spring fingers surrounding an aperture to support the optical element over the aperture by light spring pressure around the edges. An envelope for shipping the element comprises an open-ended shell for enclosing the base, and a bottom plate which can be hermetically sealed to the shell. A raised cylindrical portion of the shell surrounds the optical element restricting movement of the fingers away from the optical element and preventing accidental dislodgment of the optical element. When the base is removed from the shell the cylindrical portion is pressed into the aperture in the base to spread the fingers, permitting insertion or removal of the optical element.

Patented Oct. 6, 1970

3,532,213

INVENTORS
HERBERT A. SCHULZ
FLOYD JENSEN
ROGER D. CHASE

BY *Robert W Dilts*

ATTORNEY

HOLDER FOR INSPECTION, SHIPPING AND STORAGE OF GLASS OPTICAL ELEMENTS

BACKGROUND OF THE INVENTION

The present invention relates generally to the handling, shipping and storage of precision optical components and in particular to a holder which isolates delicate glass elements from contamination and breakage.

Modern optical instruments frequently make use of very delicate and precision glass and other ceramic elements which must be protected during handling and inspection from contamination by dirt, vapors and grease and also from breakage. Additionally, such elements must frequently withstand severe environments during shipping where mechanical shock and contaminating atmospheres might affect the optical properties. Examples of such optical elements are lenses, mirrors, optical flats and microscope slides.

A common approach to the solution of the above problems has been to enclose the precision optical element in a polyethylene or other plastic container and, during shipping, to insulate the element from shock by packing the container in a resilient medium such as wood shavings, crumpled newspapers or plastic foam. However, this approach provides no convenient means for inspection of the element in the laboratory without touching the delicate glass surfaces. Moreover this approach has the disadvantage that most plastics commonly used as containers evolve vapors and oils which contaminate the optical element over a period of time. In addition, the plastics are fairly permeable to various atmospheric vapors which might contaminate the surfaces of optical elements. Furthermore, the volume occupied by the resilient packing material can be very large in comparison with the volume of the container resulting in inefficient packing, shipping and storage.

The above-mentioned problems of contamination encountered with the plastic containers can be solved to a large extent by the use of glass or metal holders and containers which are substantially nonporous and can be hermetically sealed. Using metal or glass containers which are properly cleaned before sealing, contamination of the optical surfaces can be substantially eliminated. However, the additional problem remains of providing a holder which permits handling and inspection of the optical element without touching the surfaces, while isolating it from mechanical shock. Since rigid supports of metal can be very damaging to the optical element the temptation exists to substitute some softer more resilient medium. Materials such as thin tissue paper in several layers have been used; however, they have the disadvantage of being nearly impossible to render free of fibers and absorbed vapors.

SUMMARY OF THE PRESENT INVENTION

The principal object of the present invention is to provide an improved shipping and storage holder for precision optical elements.

One feature of the present invention is the provision of a holder which can be inexpensively fabricated from sheet metal.

An additional feature of the present invention is the provision of a holder which supports the optical element by means of resilient spring fingers.

A further feature of the present invention is the same as the preceding feature wherein convenient means are provided for spreading the spring fingers for removal of the optical element.

Another feature of the present invention is the provision of an envelope for the holder which is capable of being hermetically sealed. A further feature of the present invention is the provision of a portion of the envelope which serves as the means for spreading the spring fingers.

Additional objects, features and advantages of the present invention will become apparent from a perusal of the following specification and the accompanying drawings wherein:

DESCRIPTION OF THE PREFERRED EMBODIMENT

Figure 1:
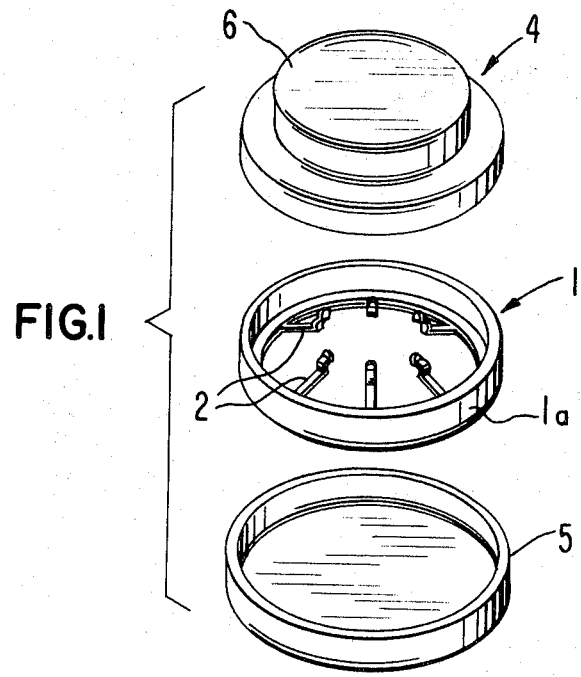
FIG. 1 is an exploded perspective view of the holder and envelope of one embodiment of the present invention.
Figure 2:
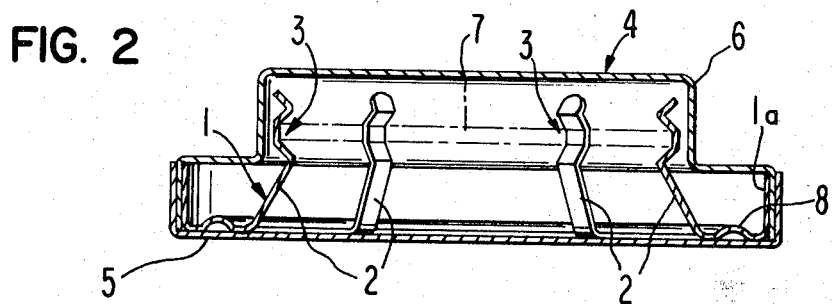
FIG. 2 is a cross-sectional view of the holder and envelope of the embodiment of the present invention shown in FIG. 1.

In FIG. 1 a base member 1 comprises a ring portion 1a having a central aperture over which spring fingers 2 project. Each of the spring fingers defines a recess at the free end thereof such that the optical element 7 in the shape of a disc, as shown in outline in FIG. 2, is supported around its perimeter by the recesses 3. An envelope comprising a shell 4 and a bottom plate 5 encloses base member 1.

Figure 3:
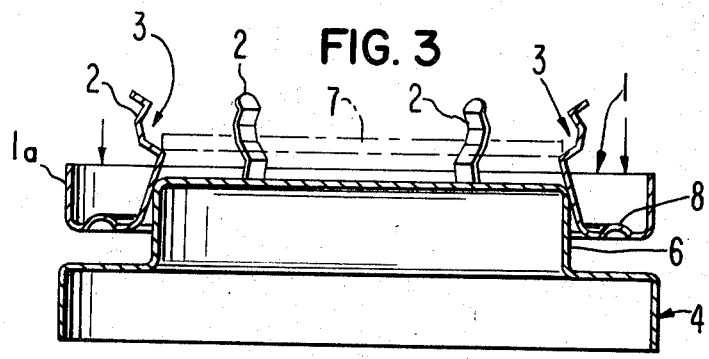
FIG. 3 is a cross-sectional view showing the expansion of the spring fingers in order to load and remove the optical element.

As seen in FIGS. 1 and 2 shell 4 has a raised cylindrical projecting portion 6 which serves to receive the end portions of fingers 2. Cylindrical portion 6 may be dimensioned such that when base member 1 is inserted within shell 4 fingers 2 are prevented from opening far enough to permit optical element 7 to drop away from the recessed portions 3. As shown in FIG. 3 portion 6 is also so dimensioned that when base member 1 is pressed over portion 6, as shown by the arrows, fingers 2 are spread sufficiently to permit insertion or removal of optical element 7. A rib 8 formed in base member 1 provides additional stiffness in order to prevent twisting of base member 1 during the insertion and removal operation.

If desired, small dimples (not shown) may be formed in either bottom plate 5 or shell 4 at the overlapping portions to provide sufficient friction between these members so that bottom plate 5 is securely held in place. A hermetic seal may be formed by coating a sealing substance over the joint between bottom plate 5 and shell 4. Base member 1, shell 4 and plate 5 may conveniently be made of sheet metal, for example stainless steel 0.010 inches thick, by suitable stamping and drawing operations.

In operation an optical element is inserted in base member 1 by pressing base member 1 over the raised cylindrical portion 6 while shell 4 is supported on a flat surface. By controlling the extent to which portion 6 penetrates within the aperture in base member 1 the degree of spreading of fingers 2 can be controlled. When the fingers 2 are sufficiently spread optical element 7 can be supported between the fingers by means of tweezers or the like. When the downward pressure on base member 1 is released fingers 2 come together lightly gripping element 7. In the event that element 7 is to be enclosed in the envelope for shipping or storage, base member 7 is inserted within shell 4 and bottom plate 5 is pressed over the open end of shell 4. Of course if base member 1 is merely to be used as a convenient means for handling and inspecting element 7, a suitable tool (not shown) having the same shape as the exterior of shell 4 could be provided for use in the laboratory.

Since element 7 is supported only by light spring pressure of the fingers 2, slight jars or knocks during shipping, for example, are readily absorbed without physical damage and without the use of the former packing materials which sometimes caused contamination. When it is desired to remove element 7 from the container for use the loading operation is merely reversed.

Since many changes could be made in the above described construction and many apparently widely different embodiments of this invention could be made without departing from the scope thereof, it is intended that all matter contained in the above description or shown in the accompanying drawings shall be interpreted as illustrative and not in a limiting sense. For example, the optical element may be rectangular or square rather than disc shaped, in which case the portion 6 of the shell would have a corresponding shape.

We claim:

1. Apparatus for supporting an object to prevent breakage and contamination thereof, comprising: a base member defining an aperture therethrough, gripping means on said base member for engaging said object around the perimeter thereof, and a shell defining an open end and receiving said base member therein through said open end, the interior of said shell being shaped and dimensioned to surround said object and gripping means to prevent disengagement of the object from said gripping means, the exterior of said shell including a projecting portion which, when said base member and shell are separated, is receivable within said aperture to cause when thrust therein withdrawal of said gripping means from engagement with said object.

2. The apparatus according to claim 1 wherein said gripping means comprises a plurality of finger members spaced around said aperture, each of said finger members defining a recess therein for engaging a perimetrical portion of said object.

3. The apparatus according to claim 2 wherein said finger members are flexible, have one end attached to said base member adjacent the edge of said aperture, have said recess formed in the other end thereof and are oriented so as to extend over said aperture.

4. The apparatus according to claim 1 wherein said gripping means comprises a plurality of spring fingers positioned around said aperture, said spring fingers having one end thereof fastened to said base member, each of said fingers defining a recess at the other end thereof for engaging a perimetrical portion of said object, said projecting portion being formed in a wall of said shell and being dimensioned to receive within the interior thereof said spring fingers and said object when said base member is contained within said shell and to force apart said spring fingers when forcibly inserted within said aperture in said base member.